(12) United States Patent  (10) Patent No.: US 8,696,028 B2
Nelson                    (45) Date of Patent:    Apr. 15, 2014

(54) JANITORIAL CONTAINER WITH SEGMENTED, DRAINABLE UTILITY COMPARTMENTS

(75) Inventor: Frankie Nelson, Chicago, IL (US)

(73) Assignee: Frankie Nelson, Chicago, IL (US)

( * ) Notice: Subject to any disclaimer, the term of this patent is extended or adjusted under 35 U.S.C. 154(b) by 847 days.

(21) Appl. No.: 12/363,400

(22) Filed: Jan. 30, 2009

(65) Prior Publication Data

US 2010/0193527 A1    Aug. 5, 2010

(51) Int. Cl.
*B08B 3/00*    (2006.01)

(52) U.S. Cl.
USPC ............... 280/830; 280/47.35; 280/47.34; 280/79.11; 280/79.2

(58) Field of Classification Search
USPC ............... 280/830, 47.35, 47.34, 79.11, 280/79.2–79.5; 248/210; 15/257.1–257.3, 15/323; 134/42, 56, 201; 211/66, 70.6; 220/507, 50, 601, 553, 555, 756
See application file for complete search history.

(56) References Cited

U.S. PATENT DOCUMENTS

| | | | | |
|---|---|---|---|---|
| 2,321,981 | A * | 6/1943 | Bowers ..................... | 211/85.21 |
| 3,453,001 | A * | 7/1969 | Cavanagh et al. ......... | 280/47.35 |
| 4,541,539 | A * | 9/1985 | Matthews ................. | 220/555 |
| 5,303,841 | A * | 4/1994 | Mezey ..................... | 220/555 |
| 6,467,779 | B1 * | 10/2002 | Mills ........................ | 280/47.26 |
| 6,648,349 | B1 * | 11/2003 | Waller et al. .............. | 280/47.35 |
| 6,755,311 | B2 * | 6/2004 | Berry ....................... | 211/70.6 |
| 6,823,998 | B2 * | 11/2004 | Fabregas ................... | 211/70.6 |
| 6,827,288 | B2 * | 12/2004 | Noelke ..................... | 239/124 |
| 7,240,910 | B2 * | 7/2007 | Stuemke .................. | 280/79.5 |
| 7,648,147 | B2 * | 1/2010 | Lauer et al. ............... | 280/47.35 |
| 8,256,242 | B1 * | 9/2012 | Evans ....................... | 62/457.7 |
| 2002/0096525 | A1 * | 7/2002 | Bertoldo et al. ........... | 220/544 |
| 2003/0217428 | A1 * | 11/2003 | Perelli ..................... | 15/260 |
| 2005/0121022 | A1 * | 6/2005 | Onken ................. | 126/343.5 A |
| 2006/0157946 | A1 * | 7/2006 | Stuemke .................. | 280/79.5 |
| 2006/0163827 | A1 * | 7/2006 | Lauer et al. ............... | 280/47.35 |
| 2007/0210546 | A1 * | 9/2007 | Presnell et al. ........... | 280/47.35 |
| 2008/0295870 | A1 * | 12/2008 | Perelli et al. ............. | 134/42 |
| 2009/0265871 | A1 * | 10/2009 | Wooten ..................... | 15/119.1 |

* cited by examiner

*Primary Examiner* — Kevin Hurley
*Assistant Examiner* — Michael Stabley
(74) *Attorney, Agent, or Firm* — Miller, Matthias & Hull LLP

(57) ABSTRACT

A portable container for carrying one or more janitorial liquids as well as janitorial supplies and equipment is disclosed. The janitorial container includes one or more closable bottom drain openings for fast and convenient draining of the janitorial liquids. The container also includes one or more attachment members for receiving, supporting, and/or securing the janitorial supplies and equipment. The container may be mounted on a wheeled cart as a part of a multi-tasking cleaning system. Methods for using the container, either independently or as mounted on the cart, to improve the efficiency and safety of janitorial operations are also disclosed.

5 Claims, 4 Drawing Sheets

JANITORIAL CONTAINER WITH SEGMENTED, DRAINABLE UTILITY COMPARTMENTS

FIELD OF THE DISCLOSURE

A portable container for carrying one or more janitorial liquids as well as janitorial supplies and equipment is disclosed having one or more closable bottom drain openings for fast, sanitary and convenient draining of the janitorial liquids. The container may also include one or more attachment members for receiving, supporting, and/or securing the janitorial supplies and equipment. The container may be mounted on a wheeled cart as a part of a multi-tasking janitorial system. Methods for using the container, either independently or as mounted on the cart, to improve the efficiency and safety of janitorial operations are also disclosed.

BACKGROUND OF THE DISCLOSURE

Wheeled janitorial trays or buckets adapted to be used onsite in sanitary maintenance are well known in the art and have found wide applications in various commercial housekeeping and maintenance duties such as in hospitals and hotels. In particular, some maintenance tasks require housekeepers or janitors to clean and sanitize utensils, fixtures, furniture, and similar objects or surfaces without removing them from the facility. In order to perform such tasks, a wheeled bucket containing one or more cleaning liquids is often transported to the vicinity of a targeted object or surface, where the housekeeper or janitor uses a sponge, mop or other suitable cleaning device to apply the cleaning liquid to clean, sanitize, and/or rinse the targeted object or surface.

To streamline the cleaning process, the cleaning equipment used to apply the cleaning liquid, such as sponges, brushes, scrubbers, and the like, may be attached, supported or secured to the wheeled bucket through one or more receptacles. However, because most of the wheeled buckets are bulky and permanently attached to the wheels, and stay on the ground during cleaning, transfer of the cleaning liquid from the bucket to the objects or surfaces often results in liquid spillage, which may requires separate mopping and/or drying processes.

Light-weight and hand-carried janitorial trays or buckets are also known in the art. For example, a portable cleaning bucket may be used to clean and sanitize objects in a room. The bucket may include an open-top container with a rectangular bottom wall and four sidewalls. The container may be divided into multiple compartments each of which contains water or cleaning composition for separate washing, rinsing, or sanitizing operations. However, the bucket has no way of draining the openings without inverting the entire bucket. This necessitates that all the adjunct cleaning supplies in the bucket be removed prior to inversion, resulting in added labor and effort.

The carts described above have been used in a wide variety of public settings such as hospitals, hotels, airports, schools, businesses, etc. The carts have been found to be versatile in meeting the various needs of sanitary maintenance duties. Nevertheless, because of the ubiquitous public applications in which such carts are used, it has been found that commercially available carts of the type described above have certain deficiencies.

For example, as all existing portable devices require the inversion of the bucket to drain the cleaning water, it is not uncommon for the housekeeper to use the same water from one room to the next. Accordingly, germs, bacteria, fungus, and disease from one patient or guest can quickly be spread around the facility.

Additionally, the cleaning liquids used in various applications are sometimes harmful if ingested or improperly handled. Storing such material in open-top containers on accessible shelves of a janitorial cart creates a risk that children, the elderly or mentally disabled passing the cart may access the chemicals and be harmed thereby if the cleaning and sanitization tasks are to be performed without evacuation of the facility.

Further, there is a tipping risk associated with transporting full bucket of liquid on the forward end of a janitorial cart. The high center of gravity of a full container may make it prone to tip under certain conditions, particularly as the cart negotiates turns. If filled with harmful or hazardous material, tipping of the janitorial bucket can result in an undesirable exposure of the surrounding environment to such material.

Hence, there is a need for a safer and more efficient portable janitorial container for carrying one or more janitorial liquids as well as janitorial supplies and equipment to perform onsite cleaning and/or sanitization. Further, there is a need for a janitorial container with a fast drain mechanism that allows convenient draining of the cleaning liquids without disturbing the janitorial supplies and equipment attached to or secured on the janitorial container. Finally, there is a need for a portable janitorial container that can be conveniently and removably mounted on a janitorial cart to streamline the cleaning and/or sanitization tasks it performs.

SUMMARY OF THE DISCLOSURE

This disclosure is directed toward portable janitorial container for use during cleaning or sanitizing operations. The disclosed container allows fast and convenient draining of one or more janitorial liquids contained therein without disturbing the positioning and security of other sanitizing or cleaning equipment it carries. The disclosed container may also be securely and removably mounted on a janitorial cart.

In a general embodiment, the janitorial container may include a bottom wall and a sidewall upwardly extending from the bottom wall, wherein the combination of the bottom wall and sidewall defines a liquid reservoir for containing at least one janitorial liquid. The bottom wall may have one or more closable drain openings thereon. The container may also include one or more attachment members attached to the sidewall of the container for receiving, supporting or securing one or more janitorial equipment or supplies.

The janitorial container may further include one or more division walls upwardly extending from the bottom wall to divide the liquid reservoir into two or more liquid compartments. Each of the liquid compartments may be adapted to contain a janitorial liquid, such as water, detergent composition, disinfecting composition, deodorizing composition, or the like. Each compartment may also be adapted to accommodate or perform a cleaning and/or sanitization task, such as pretreatment, cleaning, disinfecting, rinsing, drying, or the like. The portions of the bottom wall that define the liquid compartments may each include a closable drain opening to drain of the janitorial liquids from the liquid compartments.

The janitorial container may be mounted on a mobile janitorial cart adapted to perform multiple housekeeping or janitorial duties. For example, the container may include one or more anchoring members adapted to be coupled to a support structure of the janitorial cart. The anchor member may also allow the janitorial container to be conveniently removed from the janitorial cart for further cleaning and/or sanitization operations.

In one embodiment, the one or more drain openings on the bottom of the container are closed by one or more plugs, such as those made from plastics, rubber, metal or other suitable materials. In another embodiment, the drain openings are fitted with one or more spouts, such as flexible hoses with control valves, for discharging the cleaning liquid(s) from the container, especially when the container is mounted on the janitorial cart.

In use, the disclosed container provides a convenient bottom drain mechanism so that the cleaning equipment and supplies attached to the container can be left undisturbed during the draining of the janitorial liquid(s), thereby improving the safety and efficiency of the cleaning and sanitizing operations.

Optionally, depending on the cleaning and/or sanitization tasks to be performed, the container may include a grip handle for a housekeeper or janitor to conveniently and safely transport the container from one job site to another, and/or from the janitorial cart to the job site. The two ends of the handle may be connected to the top portion of the sidewall, the top portion(s) of the dividing wall, or a combination of both.

The container may also include one or more optional lids that cover the liquid reservoir or individual liquid compartments to prevent accidental spillage of the janitorial liquid contained therein. The shape and size, as well the opening and closing mechanisms, of the lids would be apparent to one of ordinary skill in the art in view of this disclosure.

Other advantages and features will be apparent from the following detailed description when read in conjunction with the attached drawings. It will also be noted here and elsewhere that the janitorial container disclosed herein may be suitably modified to be used in a wide variety of housekeeping and janitorial operations by one of ordinary skill in the art without undue experimentation.

BRIEF DESCRIPTION OF THE DRAWINGS

For a more complete understanding of the disclosed janitorial container, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed janitorial container or which render other details difficult to perceive may have been omitted. It should be understood, of course, that this disclosure is not limited to the particular embodiments illustrated herein.

DETAILED DESCRIPTION OF THE DISCLOSURE

Figure 1:
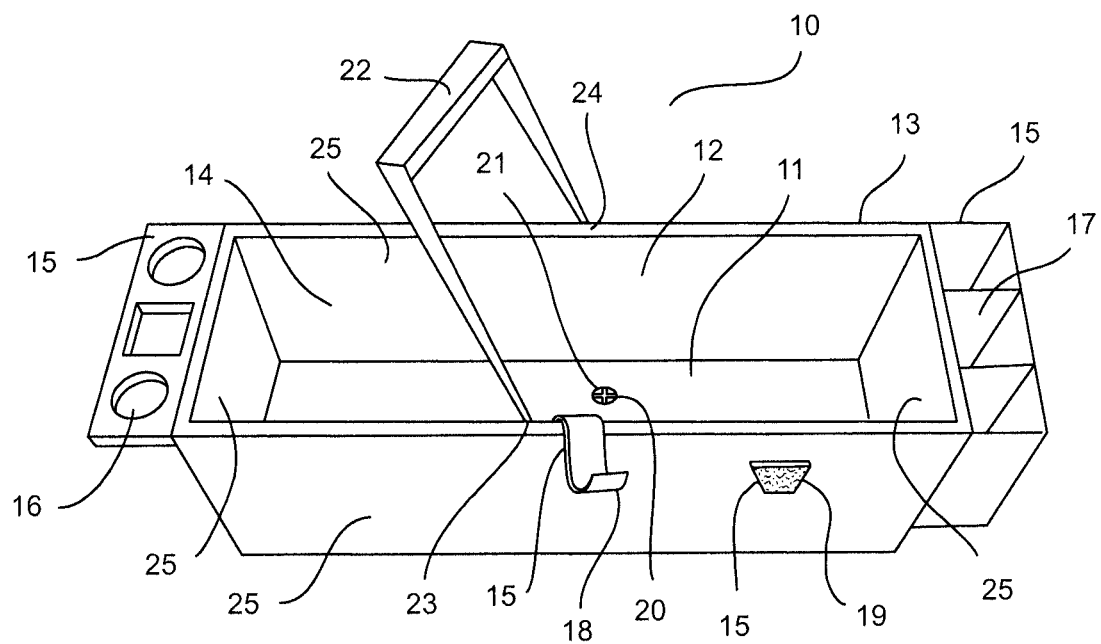
FIG. 1 is a top perspective view of one embodiment of the disclosed container in accordance with this disclosure, particularly illustrating the bottom drain opening and attachment member.

A janitorial container 10 for performing onsite cleaning and/or sanitization tasks according to this disclosure is shown in FIG. 1. The container 10 may include a bottom wall 11 and a sidewall 12 upwardly extending from the bottom wall 11 and terminating into a top rim 13. The combination of the bottom wall 11 and sidewall 12 defines a liquid reservoir 14 adapted to contain at least one janitorial liquid and/or perform or assist at least one janitorial task.

The janitorial liquid may include, but are not limited to, water, detergent composition, disinfecting composition, deodorizing composition, antimicrobial composition, pesticides, insecticides, combinations thereof, or any other liquid generally used by housekeepers or janitors when performing their duties.

The janitorial task may include, but are not limited to, transporting the janitorial liquid from one job site to another; dispensing the janitorial liquid to targeted objects, surfaces or air; housing targeted objects for pre-cleaning treatment, cleaning, rinsing, and/or drying; and other tasks generally faced by housekeepers or janitors when performing their duties.

Although the disclosed container is illustrated in FIG. 1 as having a substantially rectangular and flat bottom wall 11, it is to be understood that the shape and dimension of the bottom wall illustrated in the drawings should not be considered as limiting the scope of this disclosure. The bottom wall may also be curved such as convex or concave, stepped, bent, recessed, grooved, or irregularly shaped. Likewise, instead of being rectangular as illustrated in FIG. 1, the bottom wall 11 may also be square, triangular, polygonal, trapezoidal, circular, semicircular, annular, oval, elliptical, or of other regular or irregular shapes known in the art.

Similar to the bottom wall 11, the sidewall 12 may also take one of many forms and configurations besides the four vertical flat panels 25 interconnected at 90 degrees as illustrated in FIG. 1. For example, the sidewall may also be formed by two, three, or more than four interconnected vertical or inclined panels. The panels may be flat, curved such as convex or concave, stepped, bent, recessed, grooved, or irregularly shaped. Further, instead of multiple interconnected panels, the sidewall may simply consist of a single, continuously curved wall. For example, the sidewall may be cylindrical, elliptical cylindrical, frusto-conical, or other shapes obvious to one of ordinary skill in the art.

Although the sidewall 12 is shown in FIG. 1 as extending from the periphery of the bottom wall 11, it is to be understood that the sidewall wall may also upwardly extend from other portions of the bottom wall, so long as the liquid reservoir 14 defined by the sidewall 12 and bottom wall 11 is suitably sized to containing the janitorial liquid and/or perform the janitorial task.

Finally, the sidewall 12 and bottom wall 11 may be merged together smoothly to form a substantially hemispheric structure. For the purpose of this disclosure, the lower half of the hemisphere structure is the bottom wall 11 and the upper half of the hemisphere structure is the sidewall 12.

Still referring to FIG. 1, the container 10 may further include one or more attachment members 15 for receiving, supporting, and/or securing one or more janitorial devices or supplies. In one embodiment, the one or more attachment members 15 may be permanently fixed to the sidewall 12 of the container 10, such as by molding with the sidewall to form a one-piece structure or by bonding to the sidewall 12 through adhesives. In another embodiment, the attachment members 15 may be releasably secured to the sidewall 12 through a hanger, clip, or other releasable anchoring mechanisms known in the art. Preferably, the attachment members 15 are position outside of the liquid reservoir 14 as illustrated in FIG. 1. However, one or all of the attachment members 15 may also be positioned within the liquid reservoir 14 so long as the presence of the attachment members does not unduly interfere with the janitorial tasks performed in the container.

A wide variety of attachment members may be used in the disclosed container 10. As exemplified in FIG. 1, the attachment members 15 may include receiving openings 16, pockets or compartments 17, hooks 18, and the like. It is to be understood that the quantity, shape, rigidity, and dimension of the attachment member is not to be considered as limiting the scope of this disclosure and one of ordinary skill in the art is able to use other suitable attachment members known in the art in view of this disclosure. For example, the attachment member may be a hook-and-loop structure 19, such as a Velcro®-type structure, provided on the sidewall 12 of the container 10.

In use, the attachment members 15 may receive, support, and/or secure a wide variety of janitorial supplies and equipment. For example, the janitorial supplies may include, but are not limited to, towels, tissue papers, toilet papers, etc. The janitorial equipment, on the other hand, may include mops, brooms, brushes, sponges, dusters, dustpans, sprayers, cleaning rags, and other equipment generally used by housekeepers and janitors.

When the housekeeper or janitor performs his/her housekeeping or janitorial duties, the janitorial liquid contained in the liquid reservoir 15 may sometimes need to be drained before, during or after the janitorial task. If the janitorial liquid is drained by decantation without removing the janitorial supplies and equipment received in the attachment member 15, the janitorial supplies and equipment may be dislocated and cause injuries to the housekeeper, janitor, or a bystander, such as by hitting them directly or causing them to trip and fall. One way to eliminate the risk of such injuries is to remove all the supplies and equipment from the container before the decantation and reattach them to the container after the decantation is completed. However, the removal and reattachment are time-consuming and may increase the chance of misplacing the supplies and equipment, the combination of which significantly decreases the efficiency of the housekeeper or janitor in performing his/her duties.

Thus, it would be advantageous if the draining of the janitorial liquid is accomplished without disturbing the positioning of the janitorial supplies and equipment received, supported, and/or secured to the container 10. To that end, the portion of the bottom wall 11 that defines the liquid reservoir 14 may include a drain opening 20 through which the janitorial liquid can be discharged, such as into a sink or waste container. In one embodiment, the drain opening 20 may be closed by a plug 21 secured to the bottom wall 11 of the container 19. The plug 21 may be made of plastic, rubber, metal or any suitable material known in the art. In another embodiment illustrated in FIG. 5, the drain opening is fitted with a discharging spout, e.g. a flexible hose with a control valve at its distal end. By discharging the janitorial liquid directly from the bottom wall 11 of the container 10, both the efficiency and safety of the draining operation are improved.

Moreover, the risk of spreading germs, bacteria, disease or the like from room to room is avoided.

Figure 2:
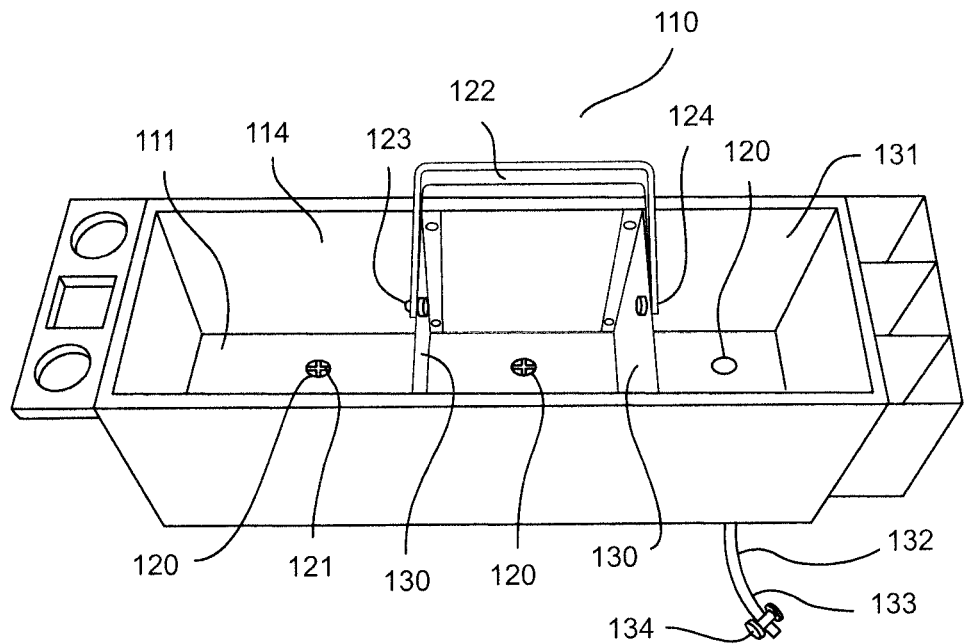
FIG. 2 is a top perspective view of another embodiment of the disclosed container in accordance with this disclosure, particularly illustrating the dividing walls and liquid compartments with individual bottom drain openings.

Turning now to FIG. 2, the container 110 may further include one or more division walls 130 upwardly extending from the bottom wall 111 and dividing the liquid reservoir 114 into two or more liquid compartments 131. Each liquid compartment 131 may be adapted to contain a distinct type of janitorial liquid and/or to perform a distinct type of janitorial tasks. However, some or all of the liquid compartments may also contain the same or similar janitorial liquid and perform the same or similar janitorial tasks. The container 110 may be evenly or unevenly divided by the division walls 130 depending on the utility of the container 110. The location and configuration of the division walls 130 would obvious to one of ordinary skill in the art without undue experimentation in view of this disclosure.

In one embodiment, the portions of the bottom wall 111 that define the liquid compartments 131 may each include a drain opening 120 adapted to discharge the janitorial liquid from the liquid compartments 131. Again, each drain opening 120 may be closed by a plug 121 secured to the bottom wall 11I of the container 110. Each drain opening 120 may also be fitted with a discharging spout 132, e.g. a flexible hose 133 with a control valve 134 at its distal end.

By providing multiple liquid compartments 131 in the container 110, several janitorial tasks can be simultaneously performed by the disclosed container, which may require draining of the janitorial liquid from different liquid compartment at different times. Clearly, such selective draining operations cannot be achieved by decantation. By providing a drain opening to each of the liquid compartments 131, draining of the janitorial liquid contained in one liquid compartment can be accomplished without discharging the janitorial liquid contained in another liquid compartment or disturbing the janitorial tasks performed therein. Not only are the efficiency and sanitation of the draining operation significantly improved, but the wasteful and unnecessary discharging of a non-used operational janitorial liquid may be avoided as well.

The janitorial container may also include a handle to facilitate the transportation of the container from one jobsite to another. The handle may include a center grip portion and at least two end portions connected to the sidewall and/or division wall of the disclosed container. In one embodiment, the connection between the handle and the sidewall and/or division wall may be fixed, such as by molding or welding. In another embodiment, the end portions may be pivotably connected to the sidewall and/or division wall, such by using a rivet.

In the embodiment illustrated in FIG. 1, the end portions (23, 24) of the handle 22 are riveted to the sidewall 12 of the container 10. In the embodiment illustrated in FIG. 2, the end portions (123, 124) of the handle 122 are reveted to the division walls 130 of the container 110. It is to be understood that the number of the end portions and the locations they are connected to the sidewall and/or division wall should not to be considered as limiting the scope of this disclosure.

Figure 3:
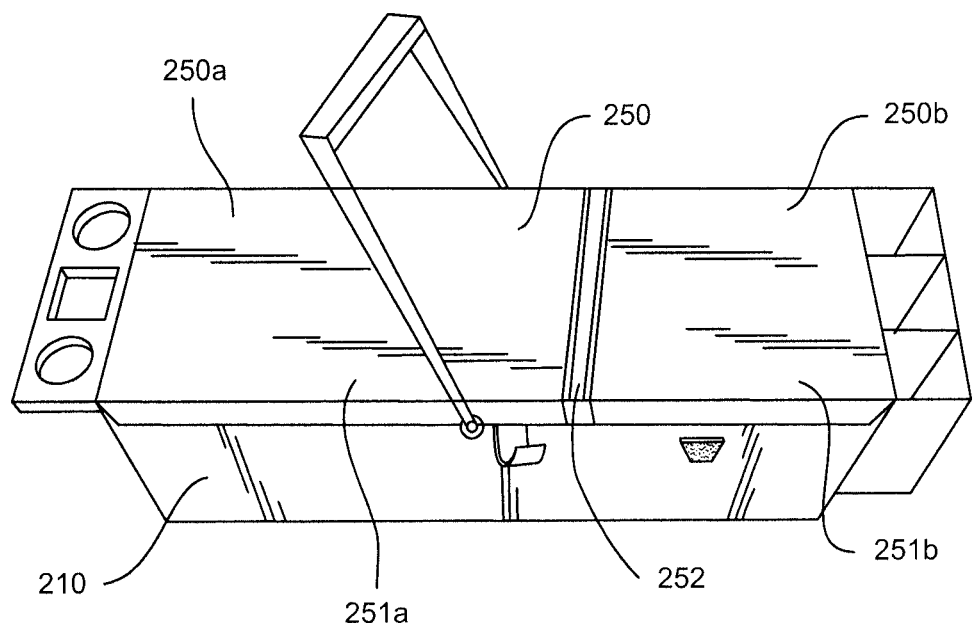
FIG. 3 is a top perspective view of another embodiment of the disclosed container, particularly illustrating the asymmetric top lid.
Figure 4:
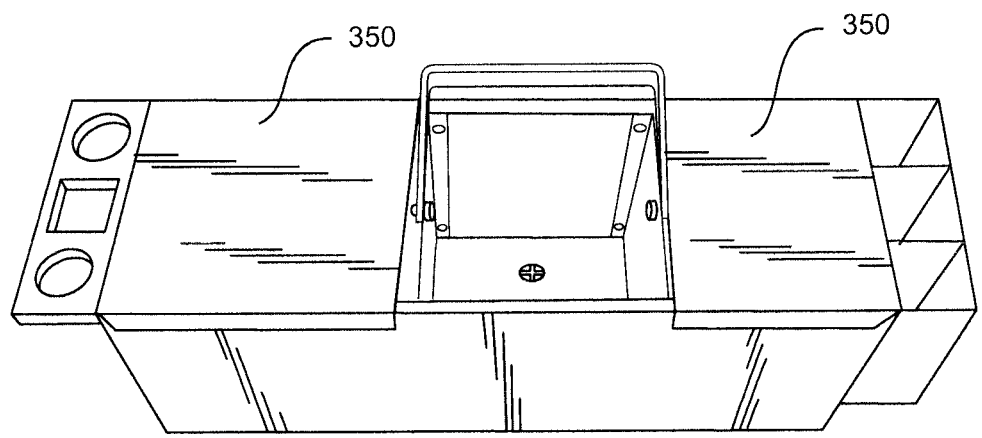
FIG. 4 is a top perspective view of the embodiment of the disclosed container illustrated in FIG. 2, particularly illustrating the top lids.

Further, in order to prevent spillage of the janitorial liquid(s) when the container is accidentally tipped or shaken, the container may include one or more lids that cover at least a portion of the top opening defined by the top rim of the sidewall. The one or more lids may be removably attached to the top rim of the container, such as through a snap-on or clip-on mechanism. The lids may also be riveted to the top rim so that they can be flipped to open and close the portions of the top opening they intend to cover. In one embodiment illustrated in FIG. 3, the lid 250 may cover substantially the entirety of the top opening of the container 210. Moreover, the lid 250 may include two separate sections (250a, 250b) each functions independently of the other to cover the compartments formed by the division wall 252. In this embodiment, the container 210 is divided into a larger compartment 251a and a smaller compartment 251b. The capacity ratio between the compartments may be 2:1, 3:1 or any other ratio obvious to one of ordinary skill in the art. In another embodiment illustrated in FIG. 4, the lids 350 selectively cover some liquid compartments while leaving other liquid compartment(s) uncovered. In any event, the number, shape, dimension and location of the one or more lids are not meant to limit the scope of this disclosure.

Some janitorial tasks may require the use of the disclosed janitorial container with other janitorial equipment. Further, housekeepers and janitors sometimes use mobile janitorial carts that carry a plurality of janitorial equipment, products and/or supplies to perform multiple janitorial tasks. Thus, it would be desirable if the disclosed janitorial container may be releasably mounted on a janitorial cart to form an multi-tasking janitorial system, thereby improving the overall efficiency and safety of the janitorial or housekeeping operations.

Figure 5:
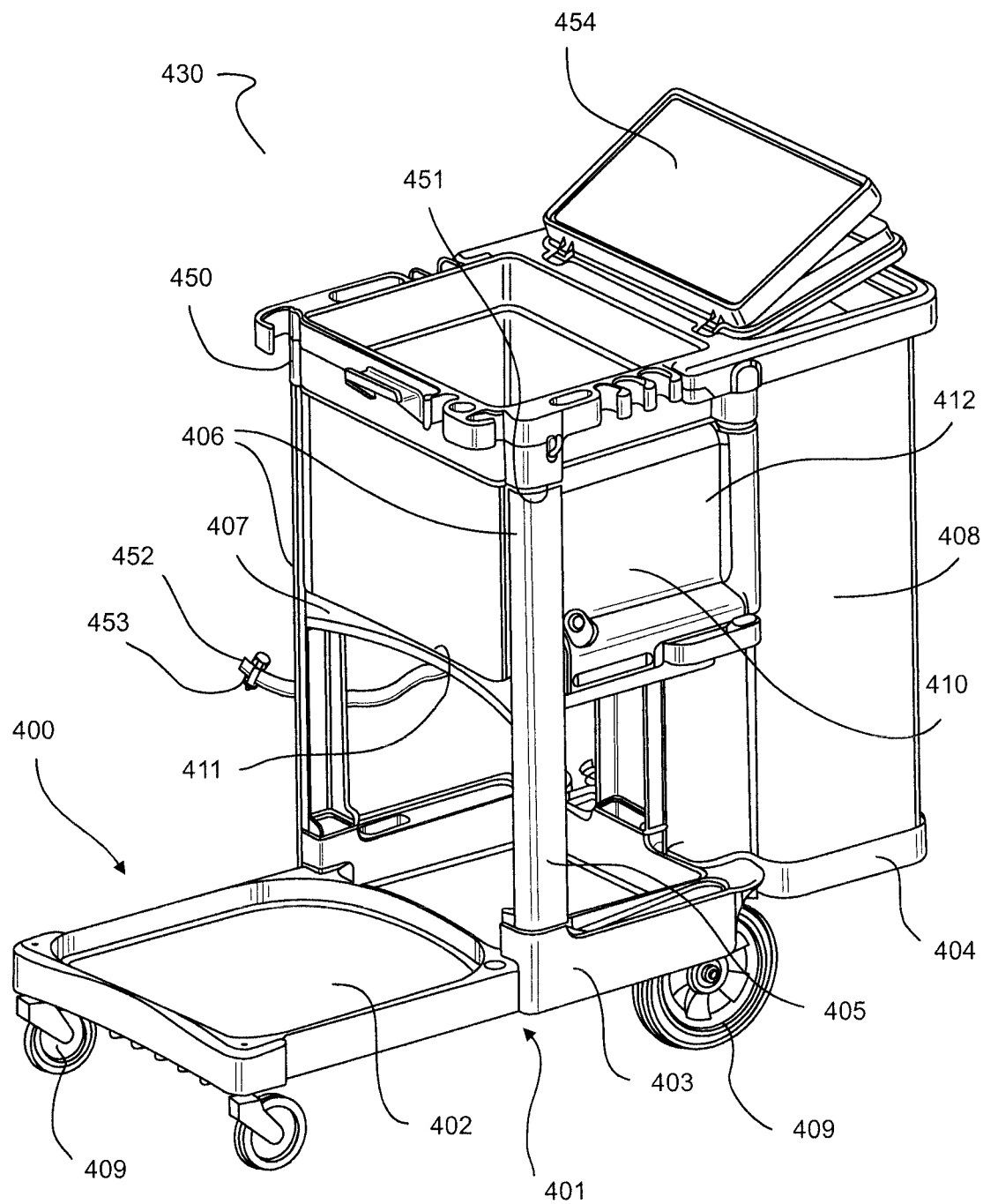
FIG. 5 is a side perspective view of an embodiment of the disclosed container mounted on a janitorial cart, particularly illustrating the single flexible hose configuration.

As illustrated in FIG. 5, a janitorial container 410 may be mounted on a janitorial cart 400 to form a janitorial system 430. The cart 400 may include a support platform 401 with a front section 402 for supporting various cleaning equipment and supplies, a middle section 403 for supporting the janitorial container 410, and a rear section 404 for supporting a garbage collection bag 408. The cart may also include three or more wheels 409 connected to the bottom surface of the support platform 401. Furthermore, the cart 400 may include one or more support structures 405 upwardly extending from the periphery of the middle section 403 for supporting, anchoring, and/or securing the janitorial container 410. In the embodiment illustrated in FIG. 5, the support structure 405 includes a plurality of support poles 406 and an optional support shelf 407. It is to be understood, however, that the configuration of the cart 410 and support structure 405 illustrated in FIG. 5 is not meant to be considered as limiting the scope of this disclosure. For example, some or all of the poles 406 may be replaced by one or more walls or panels of various configurations known in the art. Further, the support structure 405 may include more than one support shelf 407 so long as the position of shelf does not affect the mounting of the janitorial container 410 on the cart 400. While the middle section 403 is depicted with open sides, doors, partitions or the like could be provided to close. That space in thereby concealing any cleaning supplies placed therein.

To mount the container 410 on the cart 400, the sidewall 412 or bottom wall 411 of the container 410 may optionally include one or more anchoring members 450 that are coupled to or supported by the support structure 405 discussed above. In the embodiment illustrated in FIG. 5, the anchoring members 450 include a plurality of recesses 451 provided on the sidewall 412 of the container 410. Each recess 451 is adapted to matably receive the top portion of a support pole 406. Other anchoring members or mechanisms known in the art may also be used in view of this disclosure. Moreover, the inclusion of an anchoring member is optional and should not be considered as limiting the scope of this disclosure. For example, the container 410 may be properly supported by the support structure 405 by simply resting on the support shelf 407.

Some janitorial tasks may be performed while the container 410 is mounted on the cart 400. Others may require the removal of the container 410 from the cart 400 and transportation of the container 410 to a jobsite. To that end, the container 410 illustrated in FIG. 5 may be conveniently dismounted from the cart 400 by simply lifting the container 410 so that the support poles 406 are no longer received in the recess 451. Further, in order to prevent accidental spillage, an optional lid 454 can be provided to the container 410. The lid 454 can be either attached to the frame of the cart, as illustrated in FIG. 5, or attached to the container 410 (not shown).

Figure 6:
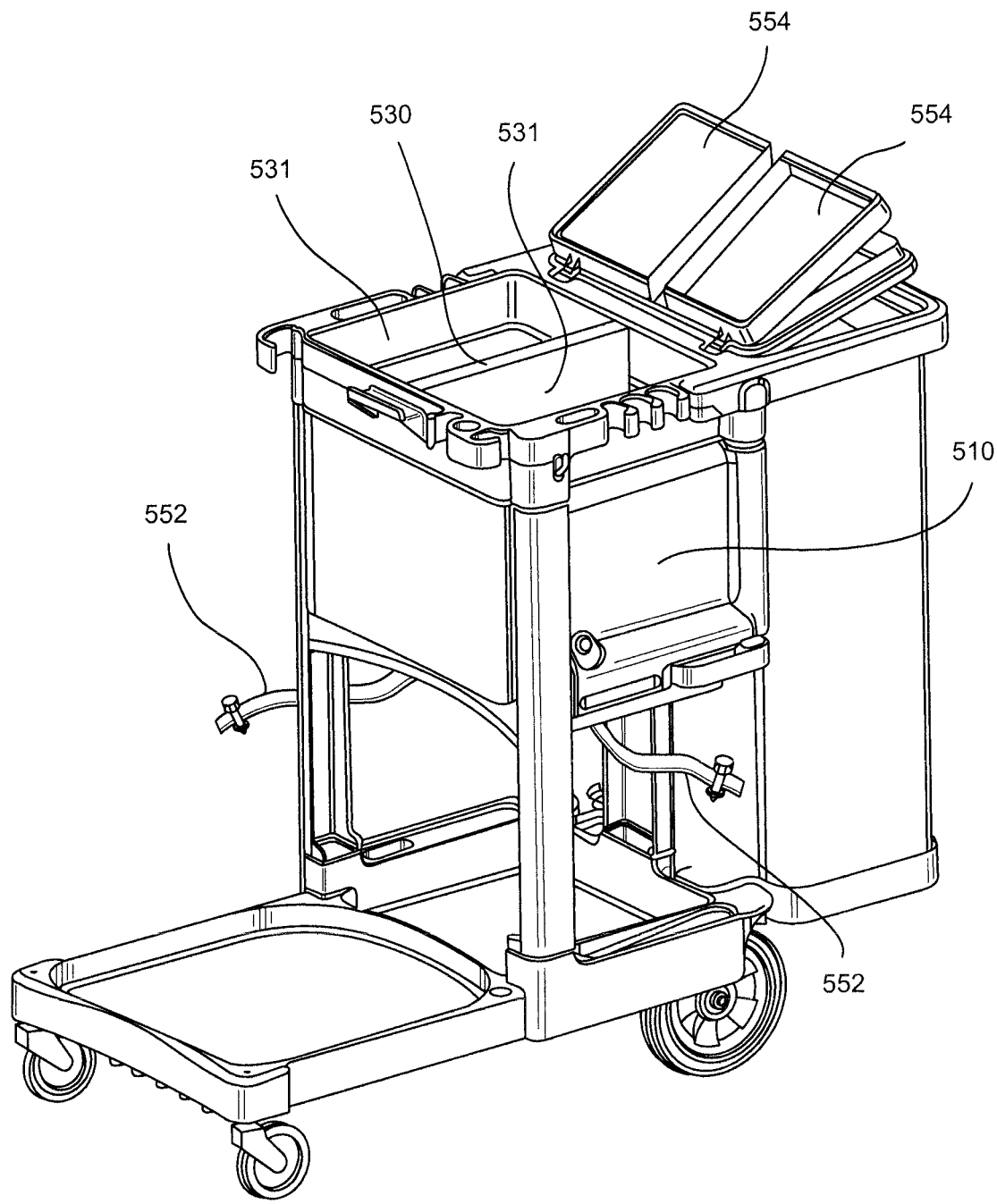
FIG. 6 is a side perspective view of another embodiment of the disclosed container mounted on a janitorial cart, particularly illustrating the multiple flexible hoses configuration.

The janitorial container may be undivided as illustrated in FIG. 5, in which the draining of the janitorial liquid therein is achieved through a flexible discharge hose 452 fitted to the drain opening (not shown) on the bottom wall of the container 410. The hose 452 may further include a valve 453 to control the discharge of the janitorial liquid. In another embodiment illustrated in FIG. 6, the container 510 is divided into two liquid compartments 531 by a division wall 530. The janitorial liquid contained in the liquid compartment 531 may be discharged through two separate hoses 552. In the embodiment illustrated in FIG. 6, the optional lid 554 may be provided as two separate units each functions independently to cover the corresponding compartments 531.

In one embodiment, the janitorial liquid may be discharged through the flexible hose(s) while the container is still mounted on the cart. In another embodiment, the liquid is discharged after the container is removed from the cart, either through the flexible hose(s) or the bottom draining opening(s).

Numerous modifications and variations of the present invention are possible in light of the above disclosure. It is therefore to be understood that, within the scope of the appended claims, the invention may be practiced otherwise than as specifically described herein. While only certain embodiments have been set forth, alternatives and modifications will be apparent from the above description to those skilled in the art. These and other alternatives are considered equivalents and within the spirit and scope of this disclosure and the appended claims.

What is claimed:

1. A janitorial system, comprising:
   a hand-held janitorial container comprising
      a bottom wall,
      a sidewall upwardly extending from the periphery of the bottom wall, the bottom wall and sidewall defining a liquid reservoir,
      at least one division wall upwardly extending from the bottom wall and dividing the liquid reservoir into at least two liquid compartments each having a separate lid and each having drain opening in a bottom wall thereof,
      an attachment member extending from an exterior face of the sidewall of the container, the attachment member being adapted to receive at least one cleaning equipment, and
      a handle pivotally attached to the janitorial container; and
   a janitorial cart comprising
      a support structure extending upwardly from a middle section of the janitorial cart to support the janitorial container, and
      at least one anchoring member having a recess formed on the sidewall of the janitorial container and configured to engage the support structure, the support structure capable of being releasable received in the recess of the at least one anchoring member for releasably mounting the janitorial container on the janitorial cart.

2. The janitorial container of claim 1, wherein the drain opening is fitted with a flexible hose having a control valve.

3. The janitorial system of claim 1, wherein the sidewall comprises a plurality of interconnected panels.

4. The janitorial system of claim 1, wherein the attachment member is selected from the group consisting of receiving openings, pockets, hooks, hook-and-loop structures, and combinations thereof.

5. The janitorial container of claim 1, wherein the at least one cleaning equipment is selected from the group consisting of mops, brooms, brushes, sponges, dusters, dustpans, sprayers, cleaning rags, and combinations thereof.

* * * * *